United States Patent Office 3,305,599
Patented Feb. 21, 1967

3,305,599
PROPYLENE DIMERIZATION
Mario D. Zadra, Barberton, and James J. Tazuma, Stow, Ohio, assignors to The Goodyear Tire & Rubber Company, Akron, Ohio, a corporation of Ohio
No Drawing. Filed Mar. 12, 1963, Ser. No. 264,703
7 Claims. (Cl. 260—683.15)

This invention relates to the preparation of propylene dimer. More specifically, it relates to a method for dimerizing propylene employing at a catalyst certain alkali metals on a support comprising a special type of magnesia. It also relates to certain specific catalyst compositions.

The prior art teaches generally that alkali metals themselves are known to polymerize propylene. However, when propylene is polymerized by means of alkali metals, a variety of polymers are formed which range from dimers, trimers, tetramers and higher. The prior art also teaches that propylene may be dimerized by means of alkali metals on supports such as alumina and carbon. However, none of these processes are particularly adaptable to commercial production for the reasons that the selectivity to propylene dimer is too low. These processes also suffer from the fact that the catalyst life has been observed to be too short for adaptability to commercial processes.

Therefore, it is the object of this invention to provide a method whereby isomeric 2-methylpentenes may be prepared from propylene. Still another object is to provide processes for the preparation of various isomeric hexenes by employing certain highly selective catalyst which will dimerize propylene to form these specific hexenes in good yields. Still other objects are to provide processes for the preparation of propylene dimer by employing catalysts which maintain their catalytic activity for sufficient time to make the processes commercially attractive. Other objects will appear as the description proceeds. Still other objects are to provide catalysts which are suitable for dimerizing propylene.

According to this invention it has been found that propylene may be dimerized by subjecting propylene to dimerizing conditions while passing said propylene over a catalyst comprising at least one alkali metal selected from the group consisting of potassium, cesium and rubidium which is supported on magnesia pellets prepared from magnesia having a bulk density of from about 4 to about 30 pounds per cubic foot, said pellets having a pellet density between about 0.1 and about 1.0 gram per cubic centimeter.

In this application pounds per cubic foot (p.c.f.) and grams per cubic centimeter (g. cc.) are both used to express density measurements.

In the practice of this invention it is generally desirable to employ a continuous process. However, batch-wise reactions may be also successfully employed.

The temperature at which propylene is dimerized according to this invention has not been found to be critical and may be said to vary from about 100° C. to about 250° C. with a range of approximately 150 to 160° C. being preferred.

The pressure of the dimerization of this invention, likewise, has not been found to be too critical and may vary broadly from about 15 to about 4,000 pounds per square inch gauge (p.s.i.g.). Successful experiments have been conducted within a range of from about 100 p.s.i.g. to about 2000 p.s.i.g. with about 750 p.s.i.g. being near the optimum.

In the practice of this invention it is usually desirable to employ pure propylene as the only reactant, however, diluents may be employed as long as these diluents do not adversely affect the reaction of the propylene itself nor destroy the activity of the catalysts. Neither should these diluents, for obvious reasons, react themselves or react with either the reactant, propylene, or the product of the dimerization. Representative of such inert diluents are paraffinic hydrocarbons such as hexane, pentane, propane and the like, as well as other gases or liquids known to be inert. Aromatic hydrocarbons, examples of which are toluene or xylene, are not desirable as diluents since it is known that under conditions and catalyst employed in the practice of this invention aromatic hydrocarbons may undergo alkylation reaction with either the reactant, propylene, or the product dimer. The amount of diluent, if employed, has not been found to be critical and may vary broadly up to a volume ratio of diluent/propylene of 100/1 or more. For economy sake, however, the volume ratio of diluent to propylene should be kept at a volume ratio of about 3 or 4/1, but as was stated above a feed of pure propylene gives best results.

The rate at which propylene is dimerized over the catalysts of this invention is not critical and may range from an LHSV of 0.5 to 20.0 with a range of from 1.0 to 5.0 being most preferred. The term LHSV is employed in this application to define the rate at which the incoming propylene gas is passed over the catalyst bed. This term LHSV is the liquid hourly space velocity and is defined as the volume of liquid propylene which passes through the reactor per hour per volume of catalyst employed. (Note—In actual practice the propylene passes over the catalyst as a gas.)

As has been stated before the catalysts employed in this invention are alkali metals supported on magnesia pellets. The magnesia employed to prepare these pellets should have a bulk density of from about 4 to 30 pounds per cubic foot. The magnesia or magnesia oxide should have a purity of at least 85% calculated as magnesium oxide. The impurity may be any other material which does not adversely affect the magnesia pellets when employed as a support or the finished catalyst. The magnesia may be prepared in any conventional manner. It may also be, in a sense, prepared in situ, for instance, the pellets may be prepared from other magnesium compounds such as magnesium carbonate. Then these magnesium carbonate pellets are heated to temperatures sufficient to convert the magnesium carbonate to magnesium oxides or to convert at least 85% of the magnesium carbonate to magnesium oxide.

The supporting pellets are usually prepared from a thick paste which is prepared with water. This paste is then formed into pellets approximately ⅛″ x ⅛″. The size of the pellets is not critical and may be varied to suit any special requirements. After the pellets have been formed they are allowed to air dry until they can be handled without damage and are then further dried in a furnace or by other suitable means at temperatures ranging from about 300° C. to about 1000° C. The pellets of magnesia employed to prepare the catalyst of this invention should have a pellet density of between about 0.1 and about 1.0 gram per cubic centimeter. Pellets with a density ranging from 0.25 to 0.7 gram per cubic centimeter are preferred.

To form the actual catalyst of this invention the dried magnesia pellets are contacted with the molten alkali metal at a temperature ranging between the melting point of the alkali metal and about 300° C. Preferred contact temperature should range from about the melting point of the alkali metal to about 100° C. It should be realized that under standard conditions the melting point of potassium is 62° C., the melting point of rubidium is 38.5° C. and cesium is 28.5° C. Sufficient contact time is allowed to achieve a uniform distribution of the metal on to the support. The period of contact between the molten metal and the dried magnesia pellets can be shortened by shaking or in some manner agitating the pellets and the molten metal. Still another method of preparation which might be mentioned is to spray the molten metal onto the prepared magnesia pellets. Various other methods of adding a molten alkali metal to a dried support may also be employed.

A percentage of alkali metal to the magnesia support employed in the practice of this invention may vary widely from about 1% to about 50% by weight of alkali metal to magnesia. However, it is usually preferred to prepare the catalysts of this invention with from about 10% to about 40% by weight of alkali metal to the magnesia pellets, with about 25% to about 40% being most preferred.

It is interesting to note that the products of the dimerization reaction of this invention are predominantly the isomeric 2-methylpentenes such as 4-methyl-1-pentene, cis-4-methyl-2-pentene, trans 4-methyl-2-pentene, 2-methyl-1-pentene and 2-methyl-2-pentene. Small amounts of isomeric normal hexenes and higher polymers are also formed. It has been observed that the temperature at which the magnesia pellets are dried has a marked effect or influence on the specific distribution of the 2-methylpentenes formed in this invention. It has been observed that when the magnesia pellets are dried at temperatures ranging from about 750° C. to about 1000° C. the selectivity to 4-methyl-1-pentene has generally ranged between about 35% to about 55% of the 2-methylpentenes formed. As the temperature at which the pellets were dried is lowered, an increase in the selectivity of 2-methyl-2-pentene has been observed. The selectivity to 2-methyl-2-pentene reaches a maximum when a catalyst, which is derived from pellets which are dried at temperatures ranging from about 100° C. to about 400° C., is employed. Thus, it can be seen that a considerable variation in the distribution of the various isomeric forms of the 2-methylpentenes can be obtained in the practice of this invention by a selection of the drying temperatures of the magnesia pellets employed to prepare the alkali metal-magnesia catalysts of this invention. The temperature at which the pellets are dried does not, as far as can be determined, have any particular effect on the activity of the catalyst as far as the dimerization of propylene is concerned.

However, in one particular embodiment of this invention, namely that of drying the pellets at temperatures ranging from about 750° C. to about 1000° C. prior to their being made into the catalyst of this invention, results in completely unexpected extremely long catalyst life. Catalyst life or the period over which the catalyst activity is sustained, indicates that the catalysts of this invention are extremely suitable for economic production processes. For instance, it has been observed that the half life of the catalyst of this invention, particularly when the pellets employed in these catalysts are dried at the higher temperature, is in excess of 100 hours whereas the half life of the prior art catalyst, i.e. alkali metals supported on carbon, alumina and potassium carbonate, is less than 50 hours under substantially equivalent conditions of operation. By the term "half life" is meant the period at which the catalytic activity drops or is reduced by 50%.

As has been stated before, the catalysts of this invention are prepared from alkali metals and magnesia pellets in which both the magnesia and the pellets have certain bulk densities. It has been observed that the magnesia from which the pellets are formed can have certain other materials added to it. When these other materials are added to the magnesia from which the pellets are formed, these other materials being termed "additives" for the lack of a better word, have a further affect upon the selectivity to certain isomeric 2-methylpentenes formed in the practice of this invention. For instance, when pellets from which the catalyst is prepared, contain small amounts of additives such as potassium carbonate, potassium chloride and potassium silicate and the pellets are dried at temperatures ranging from about 650° C. to about 1000° C., a marked improvement in the selectivity to the isomeric form, 4-methyl-1-pentene, of about 10% to about 30% is obtained. Thus, it could be said that a method of changing the isomeric form of 2-methylpentenes produced in this invention is obtained when additives such as potassium carbonate, potassium chloride and potassium silicate are added to the magnesia employed in this invention prior to its being formed into pellets. The amounts of these additives, if employed, in the support of the catalyst of this invention, should range in amounts from about 1% to about 30% by weight of the magnesia and preferably about 5% to about 15%. The pellets forming a part of the catalyst of this invention, when they contain an additive, should be dried at temperatures ranging from about 600° C. to about 1000° C. if an increase in the selectivity to 4-methyl-1-pentene is desired to be obtained.

The practice of this invention is further illustrated by reference to the following examples which are intended to be representative rather than restrictive of the scope of this invention.

In these examples dimerization of propylene was carried out in a continuous manner employing the catalyst as a heterogeneous catalyst in a tube reactor. The reactor was 14" long and had an internal diameter of 0.5", and a capacity of 100 cubic centimeters. This tube reactor was mounted in a vertical position and equipped to be heated and packed with 10 cubic centimeters of small glass balls at the bottom, upon which was placed 50 cubic centimeters of the catalyst prepared in the manner described below. An additional 40 cubic centimeters of small glass balls was placed on top of the catalyst to act as a preheating zone for the propylene. The reactor was equipped with the usual thermowells, pressure controls, inlet and outlet valves, etc., as required in normal practice. The propylene was fed to the reactor by means of pumps and the product of the dimerization collected in receivers and cooled according to normal practice. The product of these polymerizations were distilled to determine the amount of dimer, unreacted propylene and higher polymer, if any, obtained. The dimer products were analyzed by conventional gas chromatography techniques. The results are reported in each specific example along with the conditions employed in each example, all percentage figures are reported by weight unless otherwise noted.

The terms "conversion" and "efficiency," as employed in this application, are defined as follows: The term "conversion" is the total percent by weight of propylene which has undergone some reaction. The term "dimer efficiency" is the percent by weight of the propylene which reacted that resulted in some isomeric form of hexene. In the following examples the composition, or at least the predominant products of the hexenes formed, is given in terms of weight percent of the specific isometric form.

*Example I*

Magnesia having a bulk density of 10 p.c.f. was made into a thick paste using water and pressed into pellets approximately ⅛" x ⅛" were allowed to air dry for a short period of time and then dried in an air oven at a temperature of 900° C. It was determined that these pellets had a density of 0.45 g. cc. To these pellets was added 33% by weight of molten potassium at a temperature slightly above 62° C., the melting point of potassium, allowing sufficient time for uniform distribution of the metal on the magnesia pellets.

Propylene was dimerized, employing this catalyst, by passing the propylene over this catalyst at a temperature of 180° C. at a pressure of 1000 p.s.i.g. for 20 hours at an average LHSV of 2.5. A total of 874 grams of propylene were charged and 360 grams of dimer and 25 grams of higher polymer were formed. This experiment resulted in a 93% selectivity to dimer. The dimer had a composition of approximately 4-methyl-1-pentene, 55%; 4-methyl-2-pentenes, 38%; 2-methyl-2-pentene, 3%, and normal hexenes, 4%.

*Example II*

A catalyst support was prepared in the manner as in Example I except that the density of the magnesia used was 8 p.c.f. This resulted in magnesia pellets having a bulk density of 0.22 g. cc. to which 42% by weight of potassium was added.

Propylene in the amount of 874 grams was dimerized over this catalyst at 180° C., 1000 p.s.i.g. and an average LHSV of 2. The products obtained were 360 grams of dimer and 20 grams of higher polymer resulting in a dimer efficiency of 93%. The dimer had a composition of approximately 4-methyl-1-pentene, 40%; 4-methyl-2-pentenes, 45%; 2-methyl-2-pentene, 6%; 2-methyl-1-pentene, 2%, and normal hexene, 5%.

*Example III*

A catalyst support was prepared as in Example I except that the magnesia employed had a bulk density of 26 p.c.f. This resulted in the formation of magnesia pellets having a density of 0.67 g. cc. to which was added 30% by weight of potassium.

Propylene was dimerized over this catalyst at 175° C., 1000 p.s.i.g. and an LHSV of 2. This experiment resulted in an initial conversion of 74% with an efficiency to dimer of 95%. The composition of the dimer was approximately 4-methyl-1-pentene, 35%; 4-methyl-2-pentenes, 44%; 2-methyl-2-pentene, 11%; 2-methyl-1-pentene, 2%, and normal hexene, 6%.

*Example IV*

In this experiment commercial magnesia pellets which had a density of 1.0 g. cc. was contacted with 10% by weight of molten potassium to prepare the catalyst. A propylene dimerization was conducted employing this catalyst at a temperature of 180° C., a pressure of 1000 p.s.i.g. and an LHSV averaging 1.0. The conversion was 22% and the dimer selectivity was 93%. The dimer had a composition of approximately 4-methyl-1-pentene, 68%; 4-methyl-2-pentene, 20%; 2-methyl-2-pentene, 3%, and normal hexene, 6%.

*Example V*

In this experiment two catalysts were prepared employing magnesia having a bulk density of 8 p.c.f. Approximately one-half of the pellets were dried at 300° C., the other half dried at 1000° C. To each group of these pellets was added 25% of molten potassium.

A propylene dimerization was conducted over each of these catalysts at 180° C., at a pressure of 1000 p.s.i.g. at an LHSV of 2.

The catalysts prepared from the pellets dried at 300° C. produced a dimer efficiency of 93%. The dimer had a composition of approximately 4-methyl-1-pentene, 3%; 4-methyl-2-pentenes, 18%; 2-methyl-1-pentene, 15%; 2-methyl-2-pentene, 57%, and normal hexenes, 5%.

The catalyst obtained from pellets dried at 1000° C. also produced a dimer efficiency of 93%. The dimer had a composition of approximately 4-methyl-1-pentene, 37%; 4-methyl-2-pentenes, 50%; 2-methyl-1-pentene, 0.5%; 2-methyl-2-pentene, 5%, and normal hexenes, 5%.

*Example VI*

In this example two catalysts were prepared of magnesia having a density of 10 p.c.f. One group of pellets was heated to 300° C. and the other group to 1000° C. To each group of pellets was added 40% by weight of molten potassium.

Propylene dimerizations were conducted over these two catalysts at 175–185° C., pressure of 1000 p.s.i.g. at LHVS's of 2 to 3. The results of these dimerizations produced a selectivity of 93% to dimer.

The catalyst prepared from pellets dried at 300° C. produced a dimer of approximately the following composition: 4-methyl-1-pentene, 3%; 4-methyl-2-pentenes, 19%; 4-methyl-1-pentene, 15%; 2-methyl-2-pentene, 58%; and normal hexenes, 5%.

The catalyst prepared from pellets dried at 1000° C. produced dimer of approximately the following composition: 4-methyl-1-pentene, 55%; 4-methyl-2-pentenes, 38%; 2-methyl-2-pentene, 3%; and normal hexenes, 4%.

*Example VII*

Magnesium carbonate having a bulk density of 10 pounds per cubic foot was made into a paste employing water. From this paste, pellets approximately ⅛″ x ⅛″ were pressed. These pellets were allowed to air dry and further dried at 800° C. for several hours. This resulted in pellets having a density of 0.16 gram per cc. To these pellets was added 25% by weight of potassium.

This catalyst was employed to polymerize propylene at 175° C. and a pressure of 1000 p.s.i.g. and an LHSV of 2, which resulted in a dimer conversion of 50% and efficiency of 94%. This dimer had a composition of approximately 4-methyl-1-pentene, 25%; 4-methyl-2-pentenes, 57%; 2-methyl-1-pentene, 1%; 2-methyl-2-pentene, 12%; and n-hexene, 5%.

*Example VIII*

A catalyst support was prepared in a manner similar to that of Example I except that the magnesia had a bulk density of 8 p.c.f. and 10% by weight of potassium carbonate was employed as an additive. The pellets were prepared and dried at 980° C. resulting in pellets having a bulk density of 0.25 g. cc. To these pellets was added 40% by weight of potassium.

Propylene in the amount of 4125 grams was dimerized over this catalyst at 155–160° C. at 850 p.s.i.g. at an average LHVS of 1.6. Conversion in this example was 50% and the dimer efficiency was 95%. The composition of the dimer was 4-methyl-1-pentene, 75%; 4-methyl-2-pentene, 17%; 2-methyl-2-pentene, 2%; and n-hexenes, 5%.

*Example IX*

This example is included to illustrate extremely long catalytic activity or long catalyst life exhibited by the catalyst of this invention.

Pellets were prepared in a manner similar to that of Example I except that the magnesium oxide employed at a bulk density of 8 p.c.f. and 10% potassium carbonate was employed as an additive. The pellets were dried at 980° C. resulting in a pellet bulk density of 0.25. These pellets were combined with 40% by weight of potassium to form the catalyst.

A continuous dimerization reaction was conducted at a temperature ranging between 155° and 160° C. at a pressure of 850 p.s.i.g. and an LHSV averaging 1.6. At various intervals samples were taken and analyzed and the conditions of the continuous reaction were calculated. The results reported in the table below are selected at 10 to 20 hour intervals:

| Time In Hours | Period In Hours | PR | 4-Methyl-1-Pentene Efficiency | Dimer Efficiency |
|---|---|---|---|---|
| 10 | 0–10 | 0.7 | 40 | 95 |
| 20 | 10–20 | 1.0 | 68 | 96 |
| 40 | 20–40 | 0.9 | 73 | 95 |
| 60 | 40–60 | 1.0 | 74 | 94 |
| 80 | 60–80 | 1.0 | 72 | 94 |
| 100 | 80–100 | 0.9 | 73 | 93 |

PR (production rate of dimer per volume of catalyst per hour).

From the above examples it can be readily determined that when the magnesia pellets are dried at high temperatures, i.e. 750 to 1000° C., the amount of 4-methyl-1-pentene ranges between about 35 and about 75% of the 2-methylpentenes formed. As the drying temperature of the pellets is lowered to temperatures ranging from about 100 to about 600° C. the amounts of 2-methyl-2-pentene increases. This fact is particularly exemplified in Examples V and VI in which pellet drying temperatures of 300 and 1000° C. are employed to prepare the catalysts used in each of these examples. It can also be determined that the catalyst of this invention do exhibit good catalytic activity over rather long periods of time.

Other similar results may be obtained by following the techniques outlined in the above examples using the various teachings found elsewhere in this application.

While certain representative embodiments and details have been shown for the purpose of illustrating the invention, it will be apparent to those skilled in this art that various changes and modifications may be made therein without departing from the spirit or scope of the invention.

What is claimed is:

1. A process for the dimerization of propylene to form 4-methyl-1-pentene which comprises dimerizing propylene in the presence of a catalyst comprising at least one alkali metal selected from the group consisting of potassium, cesium and rubidium which is supported on pellets composed of at least 85% magnesia, said pellets having pellet density from 0.25 to 0.7 gram per cubic centimeter and where the pellets have been heated prior to having the alkali metal added to temperatures ranging from about 750° C. to about 1000° C.

2. A process according to claim 1 in which the alkali metal is potassium.

3. A process according to claim 1 in which the alkali metal is employed in an amount of from 10 to 40 percent by weight to the weight of the support.

4. The process according to claim 1 in which the alkali metal is potassium in an amount ranging from about 10 to about 40 percent by weight.

5. A process according to claim 1 in which at least one additive selected from the group consisting of potassium carbonate, potassium chloride and potassium silicate in an amount ranging from about 5 to about 15% by weight is added to the magnesia to form the catalyst support.

6. A process according to claim 5 in which the additive is potassium carbonate.

7. A process for the dimerization of propylene to form 2-methyl-2-pentene which comprises dimerizing propylene in the presence of a catalyst comprising at least one alkali metal selected from the group consisting of potassium, cesium and rubidium which is supported on pellets composed of at least 85% magnesia, said pellets having pellet density from 0.25 to 0.7 gram per cubic centimeter and where the pellets have been heated prior to having the alkali metal added to temperatures ranging from about 100° C. to about 600° C.

References Cited by the Examiner

UNITED STATES PATENTS

| | | | |
|---|---|---|---|
| 2,952,719 | 9/1960 | Appell | 260—683.15 |
| 2,986,588 | 5/1961 | Schramm | 260—683.15 |
| 2,994,727 | 8/1961 | Appell et al. | 260—683.15 |
| 3,094,461 | 6/1963 | Wilkes | 260—683.15 |
| 3,185,745 | 5/1965 | Lindsay | 260—683.15 |
| 3,216,947 | 11/1965 | Wilkes | 252—476 X |
| 3,251,895 | 5/1966 | Wilkes | 260—668 |

FOREIGN PATENTS 868,945   5/1961   Great Britain.

PAUL M. COUGHLAN, Jr., *Primary Examiner.*